May 26, 1964
R. ASHMAN
3,134,513
INSUFFLATOR
Filed Sept. 30, 1960
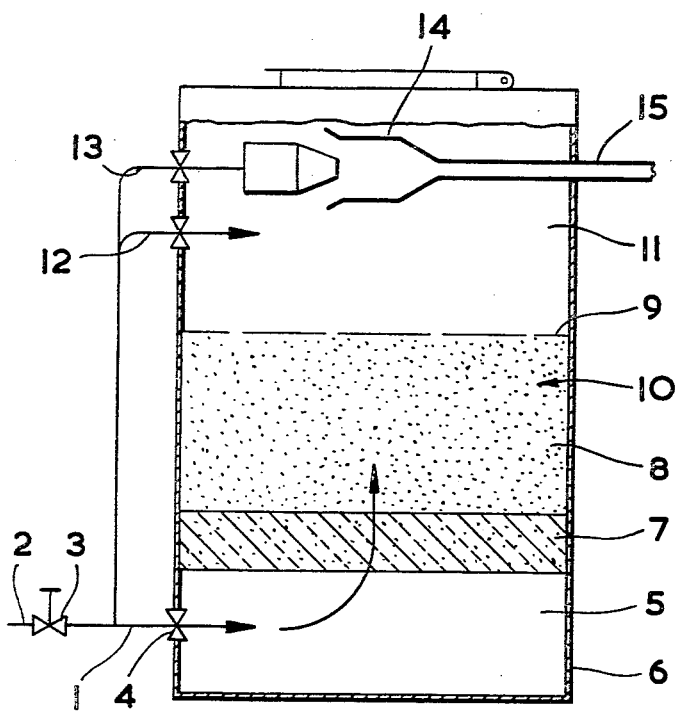
Robert Ashman, INVENTOR
BY Dwight L. Shaw, ATTORNEY

United States Patent Office 3,134,513
Patented May 26, 1964

3,134,513
INSUFFLATOR
Robert Ashman, Kingston upon Thames, England, assignor to Dust Control Processes Limited, Darlington, England, a company of Great Britain
Filed Sept. 30, 1960, Ser. No. 59,750
1 Claim. (Cl. 222—193)

This invention relates to the production of a controlled concentration of powder in a gaseous fluid and more particularly in a gaseous fluid which is intended for injection into a duct or the like.

It is sometimes necessary to inject a controlled amount of powder suspended in or carried by a gaseous fluid into a duct or vessel, such as, for example, the injection of powder into the combustion chambers or the path of flow of the combustion products of an oil fired boiler. The particles of powder may, for instance, form means for reducing the acidity of the combustion gases and of the finely divided matter carried thereby or to provide nuclei for the agglomeration of fine particles contained in said gases.

The object of this invention is to provide a method of and apparatus for controlling the concentrations of powder in a gaseous fluid intended to be introduced into a duct, vessel or the like.

According to the present invention we provide apparatus for adding controlled amounts of a powder to a stream of gaseous fluid comprising a mixing vessel divided into three chambers, an entry chamber to receive the gaseous fluid, an intermediate chamber containing powder and separated from the entry chamber by a porous distributor plate and an exit or mixing chamber containing an ejector from which powder-laden fluid is ejected from the vessel. The gaseous fluid is taken to the entry chamber by an entry pipe including a main fluid supply control valve and a jet or orifice through which the gaseous fluid may enter the vessel. A branch pipe is connected to the entry pipe between the valve and the jet or orifice and this branch pipe is taken to the exit chamber. The branch pipe before entering the exit chamber is divided into two pipe sections one entering the exit chamber simply through an orifice and the other passing to the ejector disposed in the exit chamber.

The invention also includes a method of controlling the concentrations of powder in a stream of gaseous fluid comprising tapping off a predetermined part of a stream of gaseous fluid under pressure, introducing the tapped part into a mixing vessel below a porous distributor plate which supports a supply of powder between the plate and an apertured baffle whereby the gaseous fluid passing through the distributor plate entrains a predetermined amount of the powder and then passing the powder-laden fluid to an ejector disposed within the vessel and above the baffle.

One embodiment of the invention will now be described in more detail by way of example with reference to the accompanying drawing.

In this embodiment an inlet pipe 1 is connected to a main gaseous fluid supply pipe 2 in order to tap off a controlled amount of the fluid under pressure passing through the supply pipe 2. The inlet pipe 1 is provided with a main fluid supply control valve 3 and is taken through a jet or orifice 4 to the lower 5 of three chambers in a mixing vessel 6. This lower or entry chamber 5 forms a pressure chamber bounded at the top by a porous distributor plate 7 which may be in the form of a ceramic tile. The middle or intermediate chamber 8, above the distributor plate 7 and below a baffle 9, is filled with powder 10 and the upper or exit chamber 11 above the baffle 9 forms a mixing chamber in which powder-laden fluid passing through the baffle 9 is mixed with fresh fluid entering the exit chamber 11 from outside.

The fresh fluid under pressure enters the exit chamber 11 through two pipe sections 12 and 13 which join outside the chamber and form a branch pipe leading from the entry pipe 2 at a point between the main air supply control valve 3 and the jet or orifice 4 described above. The first pipe section 12 enters the exit chamber through an orifice above the baffle 9, the purpose being to cause turbulence in the power-laden fluid rising from the baffle 9. The other, or second pipe section 13, enters the exit chamber above the first pipe 12 and the fluid is taken to an ejector 14 in which it takes up or is mixed with some of the powder-laden fluid and then passes out of the vessel along another pipe 15 to rejoin the main fluid stream.

The amount of fluid entering the vessel 6 may be controlled by operation of the main fluid supply control valve 3 and this in turn controls the amount of powder taken up. If only a little fluid is allowed into the entry chamber 5 the fluid passes slowly through the powder and does not carry much entrained powder with it. On the other hand if a considerable amount of fluid is allowed into the entry chamber 5 the fluid rushes through the powder and takes with it a large quantity of powder.

I have therefore provided a novel apparatus by means of which controlled amounts of a finely divided powder may be added to a stream of fluid under pressure, e.g. compressed air, wherein the apparatus comprises a lower or entry chamber to receive fluid under pressure, an intermediate chamber to contain powder through which the air from the lower or entry chamber passes to an upper or exit chamber and an ejector in the exit chamber adapted to receive a stream of fresh compressed fluid which takes up some of the powder-laden fluid as the fresh fluid streams through the ejector.

I have also provided a novel method of mixing powder in controlled amounts with compressed fluid which comprises feeding a first supply of compressed fluid into a vessel containing powder whereby the fluid passes through the powder and carries some of the powder with it and feeding a second supply of compressed fluid to an ejector within the vessel so that the second supply of fluid in passing through the ejector carries with it a controlled amount of the first supply of fluid including the powder.

What I claim is:

Apparatus for adding controlled amounts of powder to a main stream of gaseous fluid comprising a mixing vessel having a closed bottom and a closed top; a gas inlet orifice communicating with the bottom of said mixing vessel and with said main stream of gaseous fluid; a porous distributor plate disposed in said mixing vessel at a position which is above said gas inlet orifice; an apertured baffle plate disposed between said porous distributor plate and the top of said mixing vessel; the space between said porous distributor plate and said apertured baffle plate providing a chamber for receiving powder, a gas outlet orifice communicating with the top of said mixing vessel and with said main stream of gaseous fluid, an ejector disposed between said apertured baffle plate and the top of said mixing vessel and communicating with said gas outlet orifice, the space between said porous distributor plate and said apertured baffle plate providing a chamber for receiving powder; a gas inlet pipe communicating with said gas inlet orifice; a branch pipe connecting said gas inlet pipe and said ejector; an orifice communicating with the interior of said mixing vessel at a position which is between said apertured baffle plate and said ejector; said last-mentioned orifice communicating with said branch pipe; and powder disposed between said porous distributor plate and said apertured baffle plate.

References Cited in the file of this patent

UNITED STATES PATENTS 2,125,913    Goebels _____ Aug. 9, 1938

FOREIGN PATENTS 751,697    Great Britain _____ July 4, 1956
1,130,110   France _____ Sept. 17, 1956

OTHER REFERENCES

Germany, E 10,500 IV c/12d, July 12, 1956.